United States Patent
Padovan (10) Patent No.: US 8,657,092 B2
(45) Date of Patent: Feb. 25, 2014

(54) SAFETY COUPLING FOR THE TRANSMISSION OF ROTARY MOTION

(75) Inventor: Cesare Padovan, Asti (IT)

(73) Assignee: Maina Orani di Transmissione S.p.A., Turin (IT)

(*) Notice: Subject to any disclaimer, the term of this patent is extended or adjusted under 35 U.S.C. 154(b) by 432 days.

(21) Appl. No.: 12/995,318

(22) PCT Filed: Jun. 1, 2009

(86) PCT No.: PCT/IB2009/052298
§ 371 (c)(1),
(2), (4) Date: Nov. 30, 2010

(87) PCT Pub. No.: WO2009/144686
PCT Pub. Date: Dec. 3, 2009

(65) Prior Publication Data
US 2011/0079483 A1    Apr. 7, 2011

(30) Foreign Application Priority Data

May 30, 2008 (IT) .............................. AT2008A0003

(51) Int. Cl.
*F16D 7/04* (2006.01)
(52) U.S. Cl.
USPC ..................................... 192/56.32; 192/56.56
(58) Field of Classification Search
USPC ....................................... 192/56.32, 56.56, 56
See application file for complete search history.

(56) References Cited

U.S. PATENT DOCUMENTS

| | | | | |
|---|---|---|---|---|
| 2,964,310 A | * | 12/1960 | Stahlhuth | 267/174 |
| 3,984,999 A | * | 10/1976 | Kopp | 464/41 |
| 4,245,729 A | * | 1/1981 | Lunke et al. | 192/56.32 |
| 4,821,601 A | * | 4/1989 | Ouchi | 192/222 |
| 4,848,546 A | * | 7/1989 | McCormick et al. | 192/56.32 |
| 2005/0143881 A1 | * | 6/2005 | Taulbut | 701/29 |
| 2011/0079483 A1 | * | 4/2011 | Padovan | 192/54.3 |

FOREIGN PATENT DOCUMENTS

JP          55-159335 A          12/1980

OTHER PUBLICATIONS

International Search Report and Written Opinion issued in PCT/IB2009/052298, filed Jun. 1, 2009.

* cited by examiner

*Primary Examiner* — David D Le
*Assistant Examiner* — Steven B Christ
(74) *Attorney, Agent, or Firm* — Venable LLP; Robert S. Babayi (57) ABSTRACT

The safety coupling includes a driving part (10) and a driven part (12) able to rotate around the same rotation axis (X) and respectively provided with first torque transmission means (14, 24) and with second torque transmission means (30, 36, 40, 52, 60, 62) having front toothings (24, 40, 60, 62) normally meshing with each other for the transmission of torque between the two parts of the coupling (10, 12). The safety coupling also includes torque-sensitive opening means (66, 72, 110) arranged to disengage the front toothings (24, 40, 60, 62) of the first (14, 24) and second (30, 36, 40, 52, 60, 62) torque transmission means, thus interrupting the torque transmission, when the torque transmitted between the two parts of the coupling (10, 12) exceeds a given maximum value. The torque-sensitive opening device includes a pressure chamber filled with an incompressible fluid and a valve device adapted to automatically control the discharge of the fluid from the pressure chamber if a given maximum fluid pressure value is exceeded in the pressure chamber.

14 Claims, 5 Drawing Sheets

SAFETY COUPLING FOR THE TRANSMISSION OF ROTARY MOTION

The present invention refers to a safety coupling intended to releasably connect for rotation a first and a second transmission member—for example made as rotary shafts—rotating around the same rotation axis, the coupling being arranged to disconnect the two transmission members once a given maximum admissible torque value has been exceeded.

Safety couplings of the type specified above are commonly used in industry for the transmission of rotary motion from a source of rotary motion—such as for example an electric motor—having a rotary output transmission member to a machine having a rotary input transmission member. The safety coupling is disposed between the two transmission members and is normally kept in a first operating condition (closed condition), in which it connects said members for rotation. The safety coupling is arranged to move into a second operating condition (open condition), in which it disconnects the two transmission members in order to avoid malfunctioning or damage to the entire kinematic chain, in case of excessive loads or accidental jamming of the machine to which the rotary motion is transmitted.

It is an object of the present invention to provide a safety coupling for the transmission of rotary motion that is improved with respect to the solutions currently used.

This and other objects are fully accomplished according to the present invention thanks to a safety coupling having the characteristics specified in the attached independent claim 1.

Advantageous embodiments of the safety coupling according to the invention are the subject-matter of the dependent claims, the content of which is to be considered as an integral and integrating part of the following description.

In short, the invention is based upon the idea of providing a safety coupling including:
- a driving part and a driven part able to rotate around the same rotation axis and provided with respective torque transmission means having front toothings normally meshing with one another for the transmission of torque between the two parts of the coupling; and
- torque-sensitive opening means arranged to disengage the front toothings of the torque transmission means of the two parts of the coupling, thus interrupting the torque transmission, when the torque transmitted between the two parts of the coupling exceeds a given maximum value;

where the torque-sensitive opening means include a pressure chamber filled with incompressible fluid and valve means suitable for allowing the discharge of the fluid from the pressure chamber once a given maximum pressure value has been exceeded, the pressure chamber being configured in such a way that
- the pressure of the fluid contained in it exerts a force on the front toothings of the torque transmission means tending to keep the toothings engaged for the transmission of torque between the two parts of the coupling, and
- the torque transmitted between the two parts of the coupling through the front toothings of the torque transmission means produces an increase in the pressure of the fluid in the pressure chamber proportional to the torque value, the aforementioned maximum torque value thus being linked to the aforementioned maximum pressure value.

Compared to the prior art, the safety coupling according to the invention has, amongst others, the following advantages:
- the opening of the coupling does not require special breaking members (such as for example pins) to be broken and therefore it is not influenced by variations in the mechanical characteristics of such members;
- the opening of the coupling does not suffer from hysteresis phenomena capable of influencing the disengagement movement of mechanical members that releasably connect the driving and driven parts of the coupling;
- the coupling can be reset (i.e. brought back into the closed condition of normal operation) very quickly and easily;
- the coupling has a very compact structure, with a high torque transmission capability with respect to its diametral and axial dimensions;
- the maximum torque value that causes the coupling to open is adjustable within a wide adjustment range;
- the maximum torque value that causes the coupling to open is adjustable in a very quick and simple way, even in the closed condition of normal operation of the coupling;
- the maximum torque value that causes the coupling to open is kept constant over time, thus ensuring a high reliability of operation of the coupling;
- the coupling is self-feeding, in that it does not require an external supply of pressurised fluid during its operation, and self-compensating, in that it is able to automatically compensate for possible losses of pressurised fluid;
- the coupling offers the possibility of monitoring the torque transmitted between the driving and driven parts by simple use of a pressure transducer suitable for detecting the pressure in the pressure chamber and of a transmitter suitable for sending the signals supplied by the pressure transducer to a fixed or mobile receiver.

Further characteristics and advantages of the present invention shall become clear from the following detailed description, given purely by way of non-limiting example with reference to the attached drawings, in which.

In the description and claims which follow, the terms "axial" and "longitudinal" refer to the direction of the axis of the safety coupling, in other words of the rotation axis of the driving and driven parts of the safety coupling, whereas the terms "transverse" and "radial" refer to directions perpendicular to the axis of the safety coupling.

Figure 1:
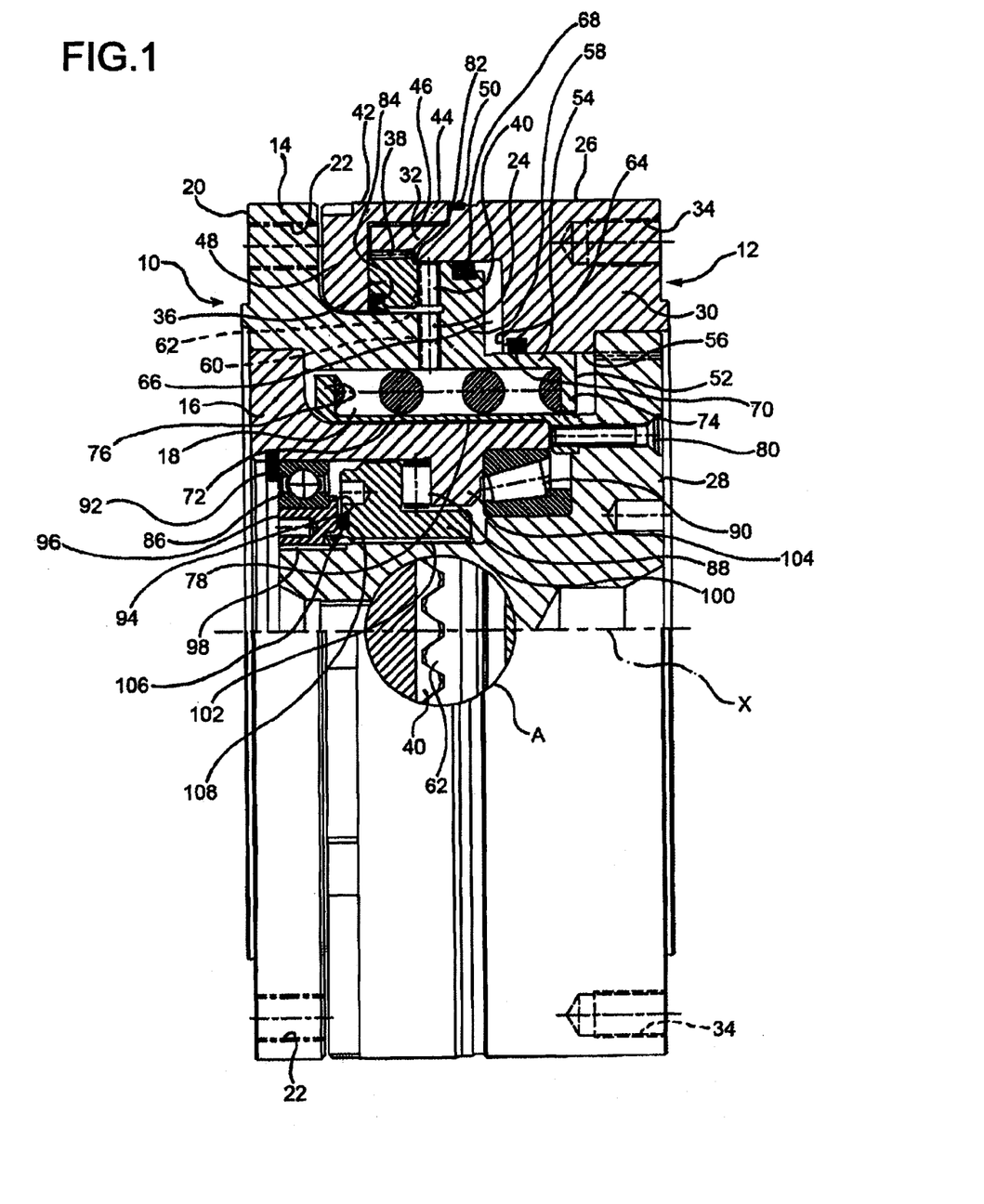
FIG. 1 shows a partial axial section view of a safety coupling according to a preferred embodiment of the present invention, in the closed condition of normal operation.

Initially with reference to FIG. 1, a safety coupling for the transmission of rotary motion according to a preferred embodiment of the present invention basically includes a driving part wholly indicated 10 and a driven part wholly indicated 12. The driving part 10 of the safety coupling, intended to be fixedly connected for rotation with a driving part of a transmission (for example a transmission shaft connected to the output of an electric motor), and the driven part 12 of the safety coupling, intended to be fixedly connected for rotation with a driven part of the transmission (for example a transmission shaft connected to the input of industrial machinery) are mounted so as to be able to rotate around the same rotation axis X.

The driving part 10 of the safety coupling comprises a first outer annular element 14 and a second inner annular element 16 rigidly connected for rotation with the first element 14 and defining a space 18 with this latter. The first element 14 of the driving part 10 forms, on the axially outer side of the safety coupling (i.e. on the opposite side with respect to the driven part 12), a flange portion 20 having a plurality of holes 22 for the insertion of screw connection devices (not shown) for rigid connection of the driving part 10 of the safety coupling for rotation with the driving part (upstream part) of the transmission. At its axially inner end (i.e. on the side facing towards the driven part 12), the first element 14 of the driving part 10 is equipped with a front toothing 24, which shall be illustrated in greater detail later on.

The driven part 12 of the safety coupling comprises a first outer annular element 26 and a second inner annular element 28 rigidly connected for rotation with the first element 26. The first element 26 of the driven part 12 comprises a first axially outer portion 30 of greater thickness and a second axially inner portion 32 of smaller thickness, which projects axially from the first portion 30 towards the driving part 10. On the axially outer face (i.e. opposite the driving part 10) of the first portion 30 of the first element 26 of the driven part 12 a plurality of holes 34 are provided for insertion of screw connection devices (not shown) for rigid connection of the driven part 12 for rotation with the driven part (downstream part) of the transmission. Between the first element 14 of the driving part 10 and the second portion 32 of the first element 26 of the driven part 12 a third annular element 36 of the driven part 12 is radially interposed and is rigidly connected for rotation with the second portion 32 of the first element 26 of the driven part 12 by means of a splined coupling 38. The third annular element 36 of the driven part 12 is equipped with a front toothing 40 vertically aligned with the front toothing 24 of the first element 14 of the driving part 10. The driven part 12 also includes a fourth element 42 integrally forming an internally threaded annular portion 44, which is screwed onto the second portion 32 of the first element 26 of the driven part 12 (provided for this purpose with a corresponding external threading 46), and a flange portion 48 that extends radially inwards and is axially interposed between the flange portion 20 of the first element 14 of the driving part 10 and the second portion 32 of the first element 26 of the driven part 12. The flange portion 48 of the fourth element 42 of the driven part 12 insists with its axially inner vertical face against the third element 36 of the driven part. The fourth element 42 of the driven part 12 thus acts as a ring nut that allows the axial position of the third element 36, and therefore of the front toothing 40, to be adjusted. A caulking 50 prevents the fourth element 42 from being unscrewed with respect to the second portion 32 of the first element 26.

Between the driving part 10 and the driven part 12 of the safety coupling a piston 52 is interposed, which comprises an annular guide portion 54 guided so as to be able to slide axially in an axial cylindrical hole 56 of the first element 26 of the driven part 12 and a flange portion 58 that extends in the radially outward direction from the guide portion 54 and is axially interposed between the first element 14 of the driving part 10 and the third annular element 36 of the driven part 12 on one side and the portion 30 of the first element 26 of the driven part 12 on the other side. The flange portion 58 of the piston 52 is equipped with a first front toothing 60 meshing with the front toothing 24 of the first element 14 of the driving part 10 and with a second front toothing 62 meshing with the front toothing 40 of the third annular element 36 of the driven part 12. The vertical face of the piston 52 axially opposite the one equipped with the front toothings 60 and 62 axially closes, together with an opposite vertical face 64 of the portion 30 of the first element 26 of the driven part 12, a pressure chamber 66 filled with incompressible fluid. In the radial direction, the pressure chamber 66 is closed internally by the guide portion 54 of the piston 52 and externally by the portion 32 of the first element 26 of the driven part 12. A gasket 68 interposed between the flange portion 58 of the piston 52 and the portion 32 of the first element 26 of the driven part 12 and a gasket 70 interposed between the guide portion 54 of the piston 52 and the portion 30 of the first element 26 of the driven part 12 ensure fluid-tightness of the pressure chamber 66.

In the normal operating condition of the safety coupling, the pressure of the fluid in the pressure chamber 66 pushes the piston 52 to the left, thus ensuring the meshing of the toothings 60 and 62 of the piston with the respective toothings 24 and 40 of the first element 14 of the driving part 10 and of the third element 36 of the driven part 12. The torque can therefore be transmitted from the driving part 10 to the driven part 12 passing in order through the first element 14 of the driving part, the piston 52, the third element 36 of the driven part and the first element 26 of the driven part. In such a condition, the axial position of the front toothing 40 of the third element 36 of the driven part 12 can be adjusted by screwing/unscrewing of the fourth element 42 of the driven part itself to ensure that possible clearances with the toothing 62 of the piston 52 are taken up.

A spring 72, for example made as a cylindrical coil spring, is received inside the space 18 between the two annular elements 14 and 16 of the driving part 10 and inside the guide portion 54 of the piston 52 to exert an axial force on the piston acting in the opposite direction to the force exerted by the pressure of the fluid in the pressure chamber 66, in other words a force tending to disengage the front toothings 60 and 62 of the piston 52 from the corresponding front toothings 24 and 40 of the first element 14 of the driving part 10 and respectively of the third element 36 of the driven part 12. The spring 72 insists at one end (the right-hand end with respect to the observer of FIG. 1) against a vertical bottom wall 74 of the guide portion 54 of the piston 52 and at the opposite end (the left-hand end with respect to the observer of FIG. 1) against a vertical bottom wall 76 of a cup element 78 fixed through screws 80 to the second element 28 of the driven part 12. As shall be explained in greater detail in the rest of the description, the spring 72 has the function of ensuring the complete evacuation of fluid from the pressure chamber 66 when the safety coupling opens due to the set maximum torque value having been exceeded.

Again with reference to FIG. 1, a gasket 82 interposed between the portion 32 of the second element of the driven part 12 and the third element of the driven part 12 and a gasket 84 interposed between the third element of the driven part 12 and the first element 14 of the driving part 10 avoid leakage of the lubricant used to lubricate the coupling surfaces of the front toothings 24, 40, 60 and 62.

Between the second element 16 of the driving part 10 and the second element 28 of the driven part 12 rotation support means are mounted, which in the embodiment illustrated in FIG. 1 comprise a first radial ball bearing 86, a second axial roller bearing 88 and a third oblique roller bearing 90. With regard to the first bearing 86, its outer ring is axially locked on the axially outer side through an elastic ring 92, whereas its inner ring is axially locked on the axially inner side through a flange 94 of an annular element 96 fitted onto a portion 98 of the second element 16 of the driving part 10. A ring nut 100 screwed onto a second portion 102 of the second element 16 of the driving part 10 axially clamps the second bearing 88 against a shoulder 104 of the second element 16 of the driving part 10 and allows the axial position of that element, along with that of the first element 14 of the driving part 10 carrying the front toothing 24, to be adjusted. A caulking 106 prevents the ring nut 100 from unscrewing from the second threaded portion 102 of the second element 16 of the driving part 10. An elastomeric element 108 is axially interposed and elastically compressed between the annular element 96 and the ring nut 100, so as to take up possible axial clearances in the bearing 86.

The detail A of FIG. 1 shows from above the front toothings 40 and 62 in the meshing condition.

Now with reference to FIGS. 2 to 5, the valve arrangement of the safety coupling that controls the automatic opening of the coupling when a given maximum value of the transmitted torque is exceeded shall now be described.

Figure 2:
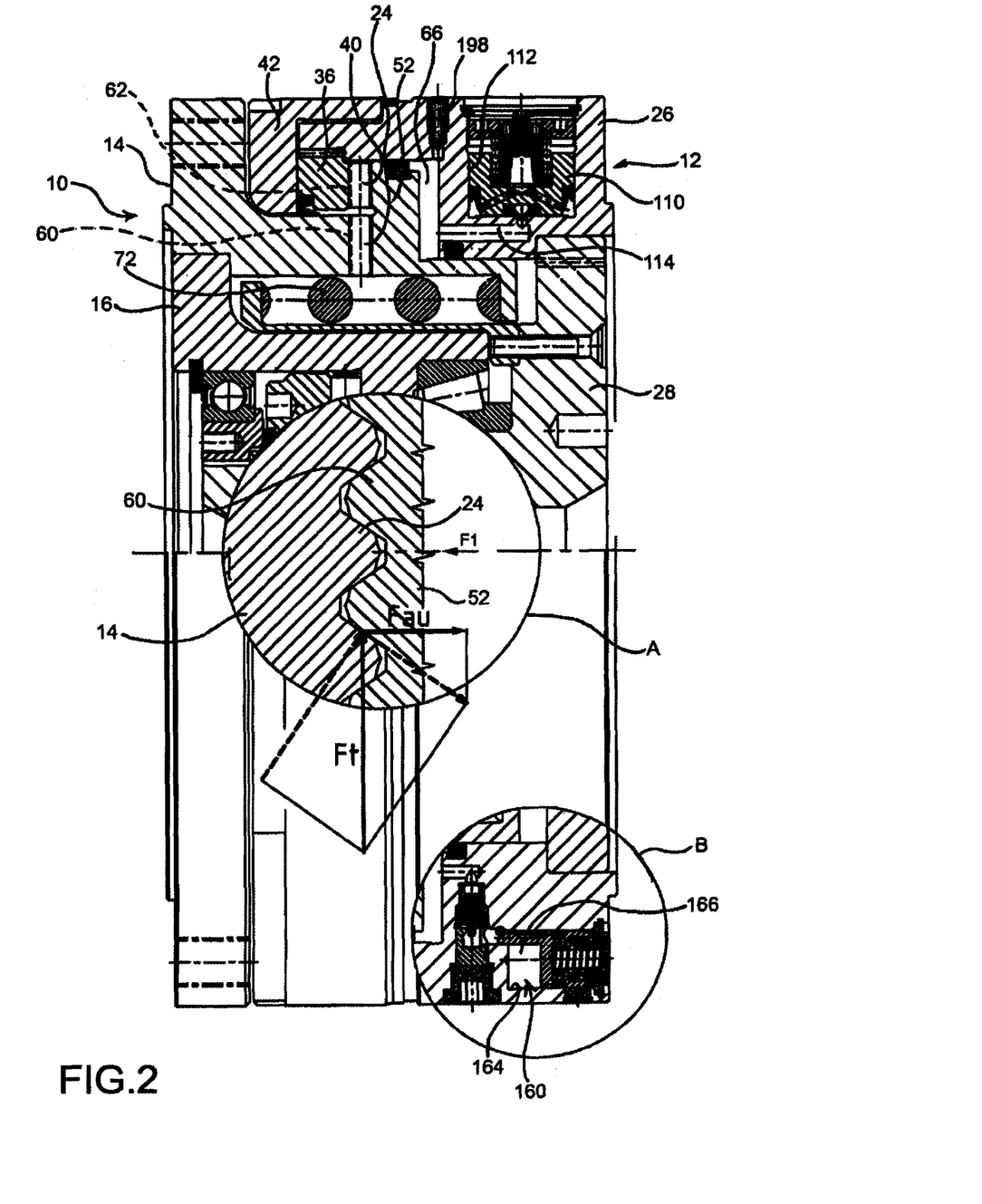
FIG. 2 shows a further partial axial section view (in a different plane to that of FIG. 1) of the safety coupling of the present invention, in the closed condition of normal operation.

Firstly, the detail A of FIG. 2 shows an enlarged view of the front toothings 24 and 62, respectively, of the first element 14 of the driving part 10 and of the piston 52, in the meshing condition. The front toothings are axially pushed against one another by an axial force $F_1$ of intensity equal to the difference between that of the axial force originating from the preloading pressure $p_1$ of the fluid present in the pressure chamber 66 and that of the axial force produced by the spring 72, which as stated earlier acts in the opposite direction with respect to the axial force produced by the pressure of the fluid in the pressure chamber 66. The torque transmitted by the driving part 10 through the first element 14 produces on the front toothing 60 of the piston 52 a tangent force $F_t$ having an axial component $F_{au}$. The resulting axial force, the intensity of which (disregarding the effect of friction between the profiles of the front toothings) is equal to the difference between that of the axial component $F_{au}$ of the tangent force $F_t$ and that of the axial force $F_1$, generates an overpressure $p_{au}$ in the fluid contained in the pressure chamber 66. The pressure $p_2$ of the fluid in the pressure chamber 66 is equal to the sum of the preloading pressure $p_1$ and of the overpressure $p_{au}$. The pressure $p_2$ of the fluid in the pressure chamber 66 is therefore proportional to the pressure $p_{au}$ induced by the axial force $F_{au}$, in turn generated by the tangent force $F_t$, and therefore it is proportional to the torque transmitted by the coupling.

As shall be better understood in light of the following description, the valve arrangement of the safety coupling according to the present invention is arranged to automatically control the discharge of the pressure chamber 66, and therefore the disengagement between the front toothings 60 and 62 of the piston 52 and the front toothings 24 and 40 of the driving part 10 and of the driven part 12, respectively, at that point subject to just the axial force exerted by the spring 72, when the pressure in the pressure chamber 66 reaches a given maximum pressure value corresponding to a given maximum torque value that can be adjusted by the user.

In this connection, the valve arrangement firstly comprises a relief valve 110, which in the embodiment illustrated in FIG. 2 is received in a suitable seat 112 (preferably cylindrical in shape) formed in the first element 26 of the driven part 12, but which could also be mounted outside of that element, for example by means of a suitable threaded fitting. The relief valve 110 is in fluid communication with the pressure chamber 66 through a duct 114 so as to sense the pressure $p_2$ present in that chamber. The relief valve is set on a given set pressure $p_r$ (which can be adjusted by the user) so as to open, thereby allowing the discharge of the fluid from the pressure chamber 66, when the pressure $p_2$ exceeds the set pressure $p_r$.

Figure 3:
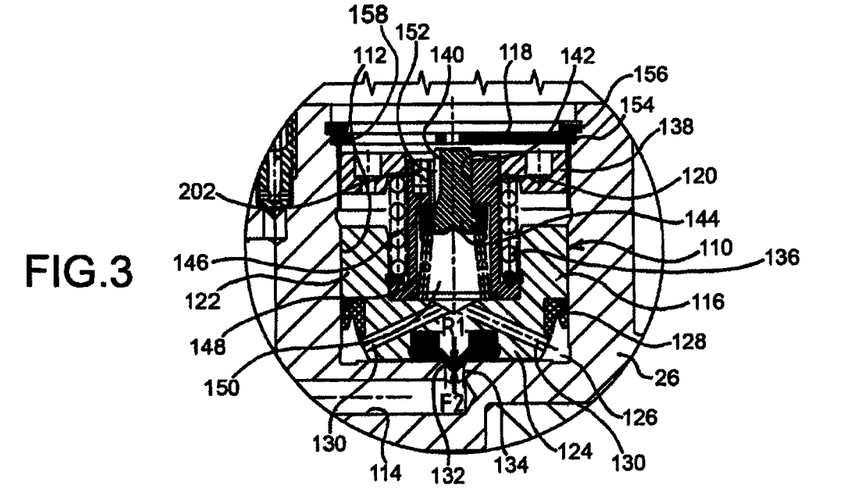
FIG. 3 shows a section view of the relief valve of the safety coupling of the present invention, in the closure condition (coupling in the closed condition of normal operation)
Figure 4:
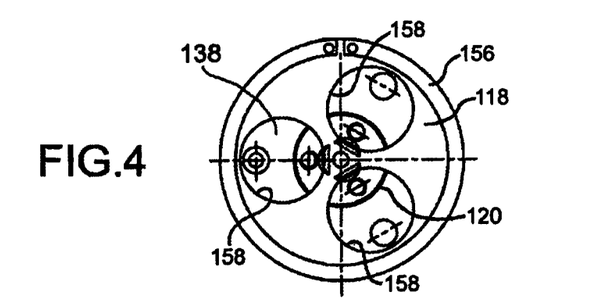
FIG. 4 shows a view from above of the relief valve of FIG. 3.

With reference in particular to FIG. 3, the relief valve 110 basically comprises a body 116 mounted so that it can slide along the axis of the seat 112, a stationary disc 118 and a cup element 120 interposed between the body 116 and the disc 118. The body 116 comprises an upper portion 122 in the shape of a hollow cylinder that has an outer diameter substantially equal to that of the seat 112 and a lower portion 124 that has a smaller outer diameter and is tapered towards the bottom, so as to define an annular gap 126 with the seat 112. A gasket 128 is interposed between the lower portion 124 of the body 116 and the seat 112. A plurality of ducts 130 cross the lower portion 124 of the body 116 thereby putting the valve part above the body portion 124 in fluid communication with the annular gap 126. On the lower face of the lower portion 124 of the body 116 a gasket 132, preferably of conical shape, is mounted, which in the closure condition of the relief valve 110 seals an orifice 134 that puts the duct 114 in fluid communication with the seat 112.

The relief valve 110 also comprises a spring 136 that is preferably made as a cylindrical coil spring arranged in the annular free space existing between the cup element 120 and the upper portion 122 of the body 116. The spring 136 insists with its lower end against a bottom flange of the cup 120 and with its upper end against a ring nut 138 screwed into a suitable internally threaded portion of the seat 112. The spring 136 pushes the cup 120, along with the body 116, downwards, thus keeping the orifice 134 closed through the gasket 132.

The relief valve 110 also comprises a pin element 140 that extends along the axis of the cup element 120 and is slidably received in a coaxial hole 142 provided in the bottom wall of the cup element 120. The pin element 140 at the bottom forms a head 144 that is provided with a gasket 146 to seal the hole 142. A spring 148 received in the cup element 120 pushes the head 144 of the pin element 140 against the bottom wall of the cup element 120, thus keeping the inner chamber of the cup element 120, indicated 150, closed. On the outer surface of the pin element 140 a plurality of grooves 152 are provided, which have the function of allowing the fluid to pass from the chamber 150 through the hole 142 when the pin element 140 moves from the closed position shown in FIG. 3 to the open position shown in FIG. 5. In the closed position of FIG. 3, the pin element 140 projects beyond the outer face of the bottom wall of the cup element 120.

The disc 118 of the relief valve 110 is locked against a shoulder 154 of the seat 112 by retaining ring 156. The disc 118 has a plurality of through openings 158 (in the illustrated example—FIG. 4—three circular openings arranged at 120°) having the function of allowing, in the discharge condition of the safety valve 110, the discharge of the fluid coming from the chamber 150 through the hole 142, as well as the passage of a suitable key to rotate the ring nut 138 for adjusting the preloading of the spring 136.

The closure condition of the relief valve 110, illustrated in FIG. 3, is maintained until the force $F_2$ exerted on the gasket 132, and therefore on the body 116, by the pressure in the orifice 134, which is the same pressure $p_2$ of the fluid in the pressure chamber 66, exceeds the reaction force $R_1$ given by the sum of the force exerted by the spring 136 and the friction force between the gasket 128 and the inner surface of the seat 112. The force of the spring 136, and therefore the set pressure $p_t$ of the relief valve 110, is adjustable by means of the ring nut 138.

Figure 5:
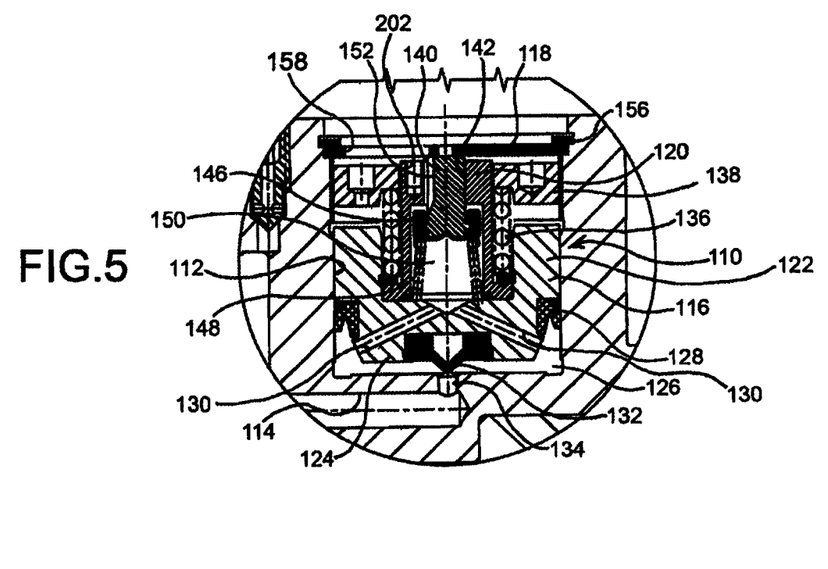
FIG. 5 shows a section view of the relief valve similar to that of FIG. 3, but in the discharge condition (coupling in the open condition)

Now with reference to FIG. 5, when the force $F_2$ exerted on the gasket 132, and therefore on the body 116, by the pressure in the orifice 134 exceeds the reaction force $R_1$, the assembly formed by the gasket 132, the body 116, the cup element 120 and the pin element 140 rises with respect to the bottom surface of the seat 112, thus allowing the fluid to pass from the pressure chamber 66, through the duct 114 and the orifice 134, to the gap 126 and from here, through the ducts 130, to the chamber 150. When the pin element 140 comes into abutment against the disc 118, a further lifting of the cup element 120 causes the pin element 140 to move from the closed position to the open position, thus allowing the discharge of the fluid from the chamber 150 through the grooves 152 in the pin element 140 and the openings 158 in the disc 118.

Figure 6:
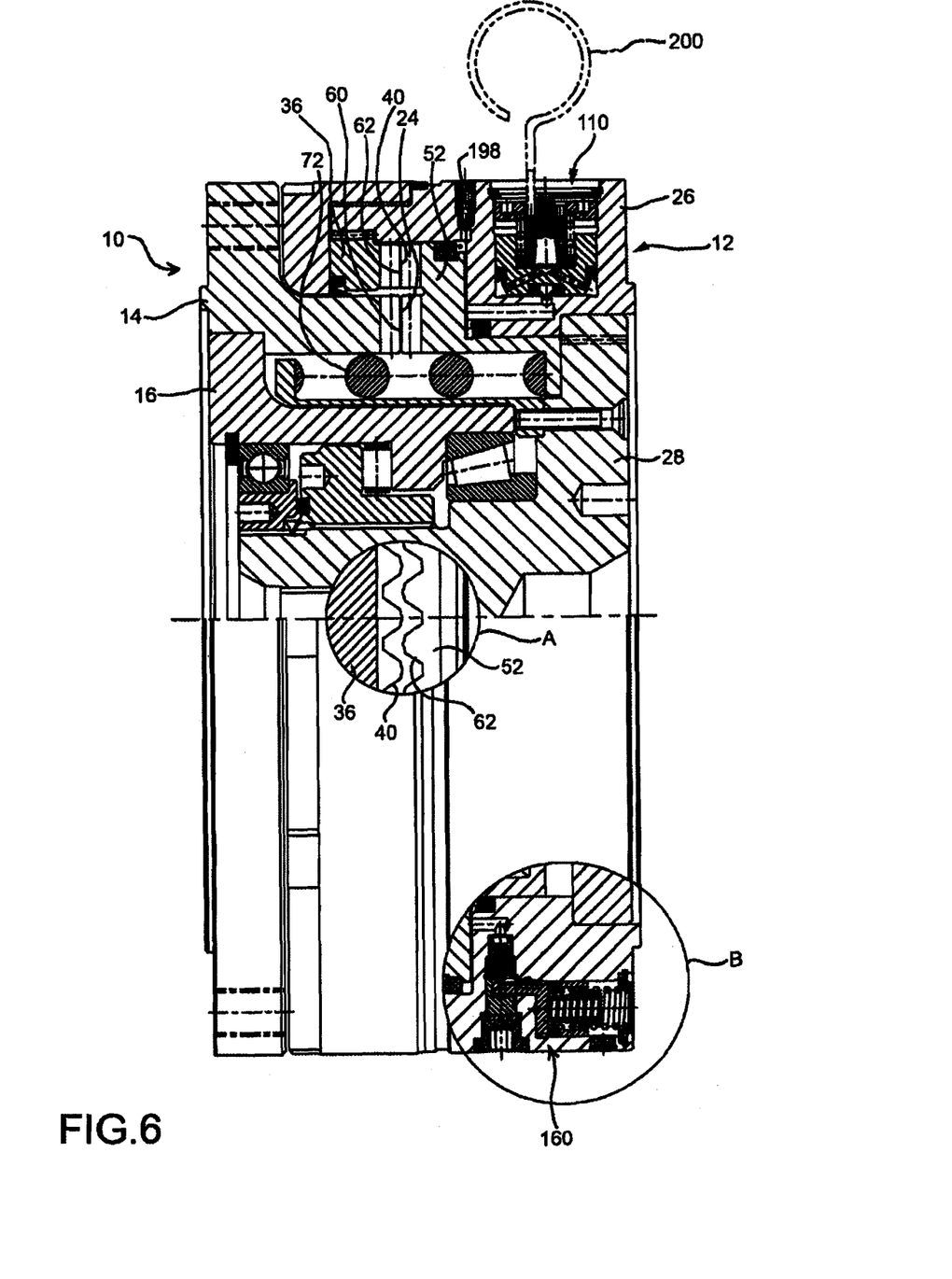
FIG. 6 shows a partial axial section view of the safety coupling of the present invention similar to that of FIG. 2, but in the open condition.

Therefore when the torque transmitted by the safety coupling is such that the pressure $p_2$ of the fluid in the pressure chamber 66 is greater than the set pressure $p_t$ of the relief valve 110, the relief valve 110 moves from the closure condition to the discharge condition, thereby allowing the discharge of the fluid contained in the pressure chamber 66 and therefore the disengagement of the front toothings 60 and 62 of the piston 52 from the associated front toothings 24 and 40 of the first element 14 of the driving part 10 and of the third element 36 of the driven part 12. Once having moved into the discharge condition, the relief valve 110 is kept in that condition thanks to the fact that the spring 72 acting upon the piston 52 is selected so as to generate a pressure in the fluid capable of overcoming the reaction exerted by the spring 136 on the body 116, consequently keeping open the orifice 134. This makes it possible to ensure the complete translation of the piston 52 to the right, and therefore the complete disengagement of the front toothings of the piston itself from those of the driving part 10 and of the driven part 12. The open condition of the safety coupling 110 is illustrated in FIG. 6.

Preferably, the safety coupling according to the present invention also comprises a storage device 160 having the function of automatically restoring possible leakages of fluid in the pressure chamber 66, thus keeping the preloading pressure $p_1$ and therefore the maximum torque value beyond which the safety coupling opens constant. The storage device is illustrated both in the detail 13 of FIGS. 2 and 6 and, on an enlarged scale, in FIG. 7. In FIG. 2 the storage device is shown in the position corresponding to the closed condition of the safety coupling, whereas in FIGS. 6 and 7 the storage device is shown in the position corresponding to the open condition of the safety coupling.

Figure 7:
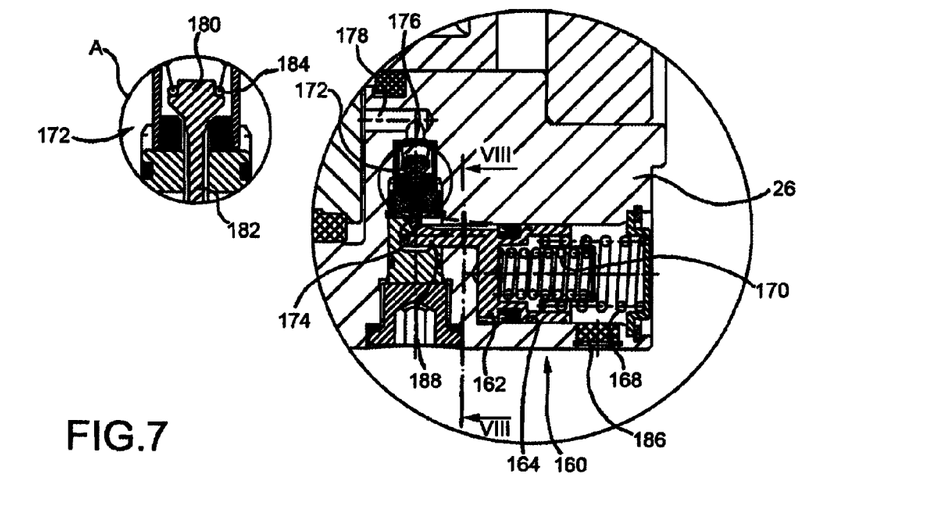
FIG. 7 shows an enlarged section view of the storage device of the safety coupling of the present invention.

With reference in particular to FIG. 7, the storage device 160 firstly comprises a piston 162 slidably received in a seat 164 provided in the second element 30 of the driven part 12, in the illustrated example on the diametrically opposite side with respect to the seat 112 that receives the relief valve 110, the piston 162 with the seat 164 forming a balancing chamber 166 (FIG. 2) filled with pressurised fluid at the preloading pressure $p_1$ of the pressure chamber 66. A pair of springs 168 and 170 acting in series, made in the illustrated example as cylindrical coil springs, pushes the piston 162 towards the bottom wall of the balancing chamber 166, thus tending to expel the fluid contained therein.

The storage device also comprises a check valve 172 interposed between a chamber 174, which is in fluid communication with the balancing chamber 166, and a chamber 176, which is in fluid communication, through a duct 178, with the pressure chamber 66. The check valve 172, illustrated on an enlarged scale in the detail A of FIG. 7, comprises a shutter 180 equipped with a stem 182 and a spring 184 tending to keep the shutter 180 in the closed position. The check valve 172 thus allows the fluid to pass only in the direction from the balancing chamber 166 to the pressure chamber 66. In case of fluid leakage from the pressure chamber 66, the pressure in that chamber decreases and, due to the pressure difference between the chambers 174 and 176, the check valve 172 opens allowing the fluid contained in the balancing chamber 166 to flow out into the pressure chamber 66 until the original pressure value $p_1$ is restored. A transparent lid 186 allows the user to check the position of the piston 162 and therefore to check the filling state of the balancing chamber 166.

Upon opening of the relief valve 110 in case of the maximum torque value transmitted by the safety coupling having been exceeded, the pressure drop downstream of the check valve 172 causes the complete displacement of the piston 162, pushed by the springs 168 and 170, against the bottom surface of the balancing chamber 166. In such a position, the piston 162, which is provided with a control projection 188 cooperating with the stem 182 of the shutter 180 of the check valve 172, keeps the shutter 180 raised and therefore the check valve 172 opened.

Figure 8:
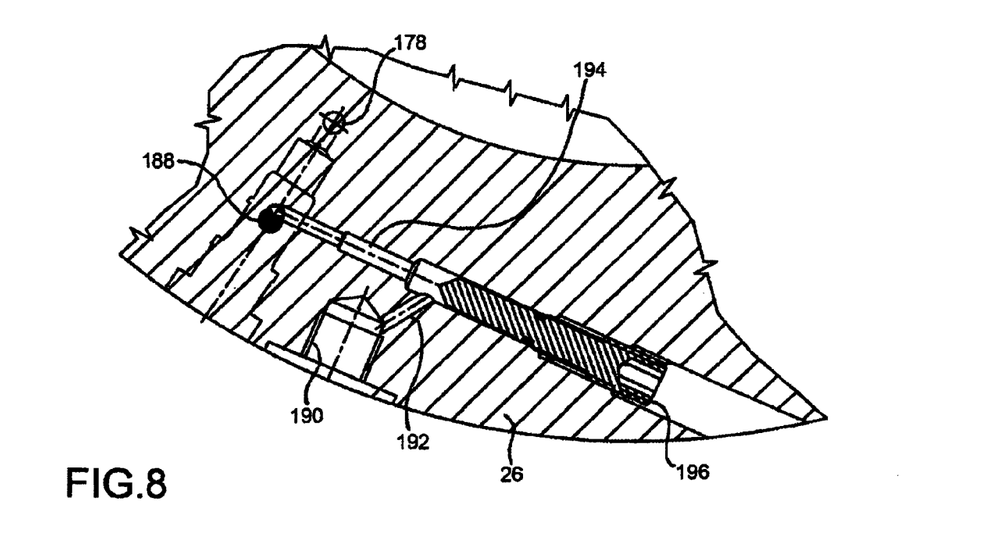
FIG. 8 shows an enlarged section view (taken along plane VIII-VIII of FIG. 7), of the fluid feeding duct of the safety coupling of the present invention.

Finally, with reference to FIG. 8, in order to allow fluid to be supplied to the pressure chamber 66 in the so-called resetting step, i.e. when the safety coupling returns to the closed condition after having opened, in the first element 26 of the driven part 12 a supply mouth 190 is provided which is in fluid communication, through a passage 192, with a supply duct 194 that opens out into the chamber 174 upstream of the check valve 172. A screw-down valve 196 allows the passage 192 to be opened or closed.

The resetting operation of the safety coupling takes place in the following way. Firstly, the driven part 12 of the coupling is rotated until the relief valve 110 is brought into the highest position, in order to allow the air to be drained during the filling by gravity of the pressure chamber 66. At this point, after having inserted the supply fitting (not shown) into the supply mouth 190, having opened the screw-down valve 196, and having opened a purge valve 198 (FIGS. 2 and 6) communicating with the pressure chamber 66, the filling by gravity of the pressure chamber 66 is carried out. In order to keep the relief valve 110 open during the filling step, the cup element 120 of that valve is raised by means of a suitable handle 200 able to be grasped by the user and screwed with one of its ends into a threaded blind hole 202 (FIGS. 3 and 5) provided in that element and accessible from the outside through one of the openings 158 in the disc 118. As soon as pure fluid, without air bubbles, comes out from the relief valve 110 and from the purge valve 198, the relief valve 110 is allowed to return to the closure position and the purge valve 198 is closed. At this point pressurised fluid starts to be pumped in the chamber 66. The piston 52 is thus moved to the left (with respect to the observer of FIGS. 1, 2 and 6) against the force of the spring 72 until complete meshing between the front toothings 60 and 62 of the piston itself and the front toothings 24 and 40 of the driving part 10 and of the driven part 12, respectively. At the same time, the piston 162 of the storage device 160 is moved to the right (with respect to the observer of FIG. 7) and the balancing chamber 166 is filled with pressurised fluid. Once the preloading pressure $p_1$ is reached, the screw-down valve 196 is closed so as to interrupt the fluid communication between the supply mouth 190 and the supply duct 194, and the supply fitting is unscrewed from the supply mouth 190.

According to an embodiment of the present invention, the safety coupling can be provided with a device for detecting the torque transmitted, which device basically includes a pressure transducer suitable for detecting the pressure in the pressure chamber (which, as explained earlier, is proportional to the torque transmitted between the driving and driven parts of the coupling) and a transmitter suitable for sending the signals supplied by the pressure transducer to a fixed or mobile receiver. The user can thus check, moment by moment or upon request, the value of the torque transmitted by the safety coupling.

Naturally, the principle of the invention remaining unchanged, the embodiments and the manufacturing details can be widely varied with respect to those described and illustrated purely by way of non-limiting example.

The invention claimed is:

1. A safety coupling for the transmission of rotary motion, including:
   a driving part and a driven part rotatable around a same rotation axis and including, respectively, a first torque transmission device and a second torque transmission device each having front toothings normally meshing with one another to form two parts of a coupling for the transmission of torque; and
   a torque-sensitive opening device adapted to disengage the front toothings of the first and second torque transmission devices, thus interrupting the torque transmission, when the torque transmitted between the two parts of the coupling exceeds a given maximum torque value,
   wherein the torque-sensitive opening device includes a pressure chamber filled with an incompressible fluid and a valve device adapted to automatically control the discharge of the fluid from the pressure chamber if a given maximum fluid pressure value is exceeded in the pressure chamber,
   wherein the pressure of the fluid in the pressure chamber exerts a force on the front toothings of the first and second torque transmission devices to maintain the meshing of the front toothings for the transmission of torque between the two parts of the coupling, and
   wherein the torque transmitted between the two parts of the coupling through the front toothings of the first and second torque transmission devices produces an increase in pressure of the fluid in the pressure chamber proportional to the torque transmitted, and said maximum torque value is correlated to said maximum fluid pressure value.

2. The safety coupling according to claim 1, wherein the front toothings of the first torque transmission device comprise a first front toothing, wherein the front toothings of the second torque transmission device comprise a second front toothing lying in the same plane, perpendicular to the rotation axis, as the first front toothing, and wherein the second torque transmission device also includes an axially movable piston having a third front toothing adapted to mesh with said first front toothing and a fourth front toothing adapted to mesh with said second front toothing, the piston being pushed towards said first and second front toothing by the pressure of the fluid in the pressure chamber, to ensure, in a closed condition of normal operation of the coupling, the meshing between the first, second, third and fourth front toothings and therefore the transmission of torque between the driving part and the driven part.

3. The safety coupling according to claim 2, wherein the second front toothing comprises an axially adjustable element of the driven part that is axially adjustable to allow the second front toothing to be positioned in the same plane as the first front toothing.

4. The safety coupling according to claim 3, wherein the piston includes a guide portion guided to slide axially in a cylindrical hole of the driven part the axis of which coincides with the rotation axis.

5. The safety coupling according to claim 4, wherein the driven part comprises an axially fixed element that contains the cylindrical hole and that, together with the piston, encloses the pressure chamber.

6. The safety coupling according to claim 5, further comprising a splined coupling adapted to connect the axially adjustable element and the axially fixed element of the driven part to one another for rotation.

7. The safety coupling according to claim 2, wherein the torque-sensitive opening device includes a first elastic device adapted to push the piston in the opposite direction with respect to the force exerted by the pressure of the fluid in the pressure chamber.

8. The safety coupling according to claim 1, further comprising a duct coupled to the pressure chamber, wherein the valve device includes a relief valve arranged at the end of the duct communicating with the pressure chamber, the relief valve being movable between a closure position in which it seals the duct, and a discharge position in which it opens the duct allowing the discharge, through said duct, of the fluid contained in the pressure chamber, wherein the maximum fluid pressure value is equal to a set pressure of the relief valve.

9. The safety coupling according to claim 8, wherein the relief valve comprises a movable body adapted to close the duct and a second elastic device adapted to exert a force on the movable body to keep the movable body in the closure position.

10. The safety coupling according to claim 9, wherein the relief valve includes an adjustment device adapted to adjust the set pressure of the relief valve.

11. The safety coupling according to claim 10, wherein the adjustment device of the relief valve includes a ring nut adapted to adjust the preloading of said second elastic device.

12. The safety coupling according to claim 1, further comprising a fluid storage device adapted to automatically compensate for possible fluid leakages in the pressure chamber.

13. The safety coupling according to claim 12, wherein said fluid storage device includes a second piston slidably arranged in a respective seat, wherein the second piston and the seat comprise a balancing chamber filled with pressurized fluid and adapted to communicate with the pressure chamber, and a check valve adapted to allow fluid to pass only in the direction from the balancing chamber to the pressure chamber.

14. The safety coupling according to claim 1, further comprising:
   a pressure sensor adapted to supply a signal indicative of the pressure of the fluid in the pressure chamber;
   a transmitter device adapted to transmit the signal supplied by the pressure sensor: and
   a receiver adapted to receive the signal transmitted by the transmitter device to allow the torque transmitted by the safety coupling to be monitored.

* * * * *